Sept. 9, 1924.
P. M. ADEN
DETACHABLE RIM
Filed Feb. 26, 1923
1,507,564
2 Sheets-Sheet 1
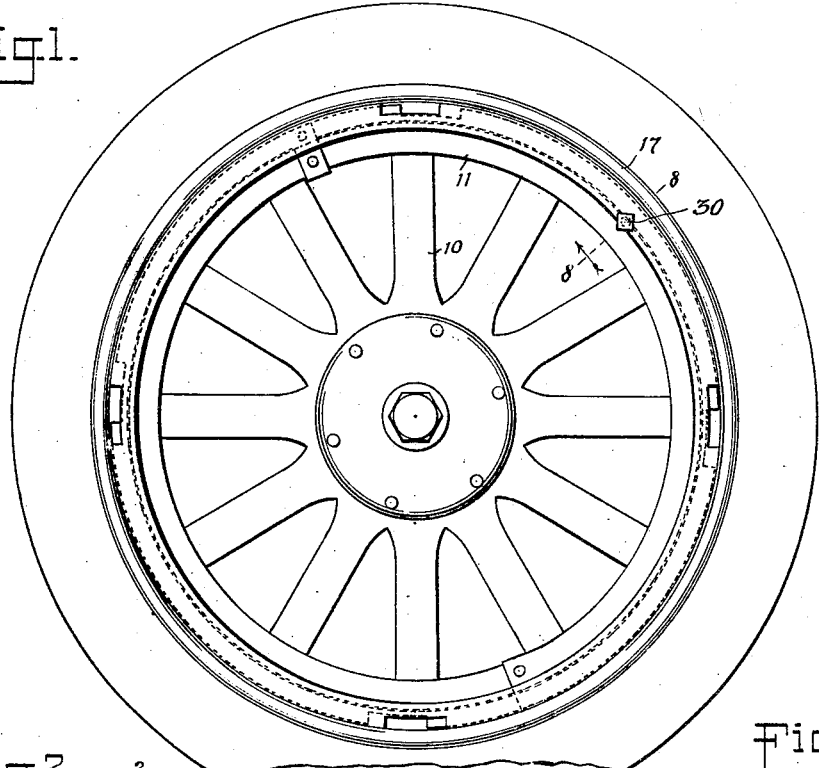
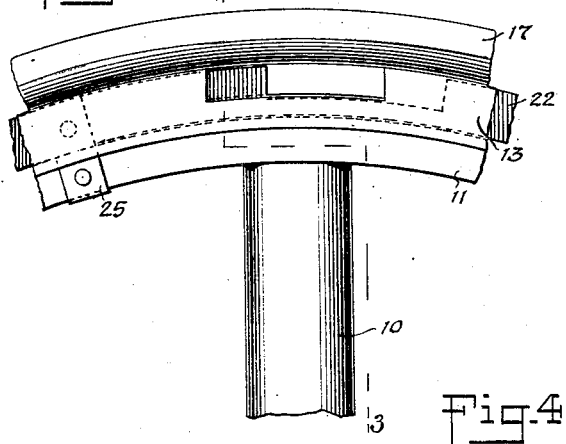
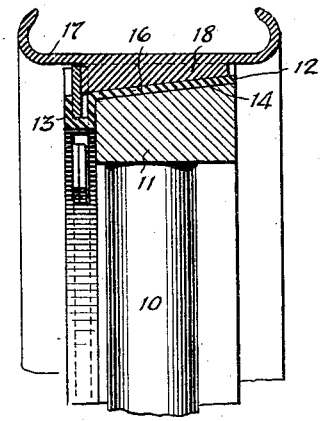
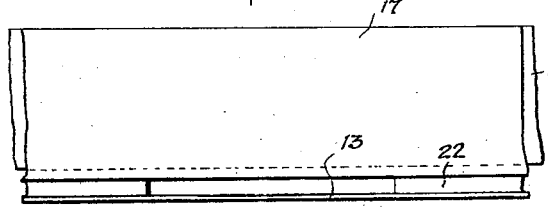
WITNESSES
INVENTOR
P. M. ADEN
BY
ATTORNEYS

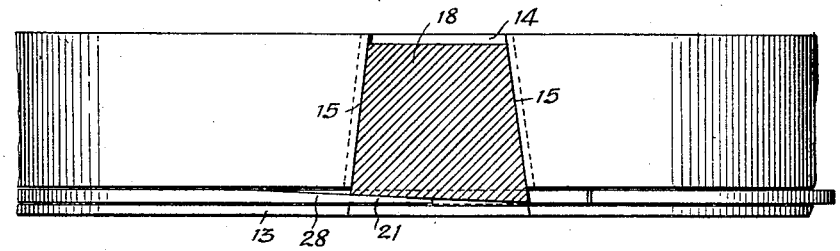
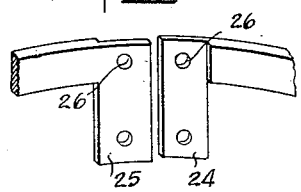
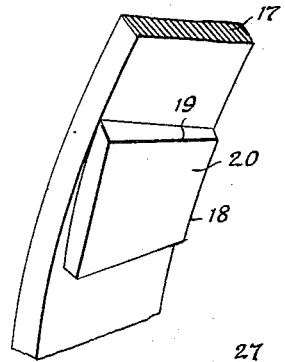
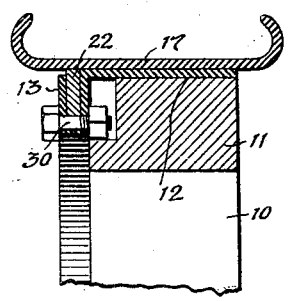
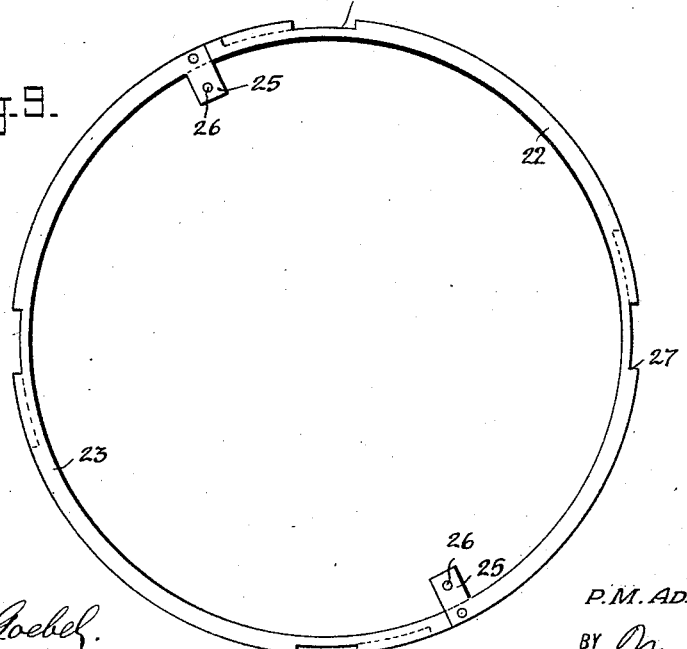

Patented Sept. 9, 1924.

1,507,564

UNITED STATES PATENT OFFICE.

PERRY M. ADEN, OF VALLEY PARK, MISSISSIPPI.

DETACHABLE RIM.

Application filed February 26, 1923. Serial No. 621,366.

*To all whom it may concern:*

Be it known that I, PERRY M. ADEN, a citizen of the United States, and a resident of Valley Park, in the county of Issaquena and State of Mississippi, have invented a new and Improved Detachable Rim, of which the following is a full, clear, and exact description.

The present invention relates to new and useful improvements in detachable rims, and it pertains more particularly to a rim of the character adapted for use in connection with pneumatic tires of vehicles such as automobiles and the like.

It is one of the primary objects of the invention to provide a detachable rim which may be readily and quickly secured to or removed from the wheels of a vehicle.

It is a further object of the invention to construct the rim so that the same will be immovable circumferentially of the wheel to which it is attached.

It is a further object of the invention to construct the rim so that it can be attached to the wheel of a vehicle only in the correct manner, thus preventing an incorrect positioning of a rim relative to its wheel.

It is a still further object of the invention to construct the rim so that the same may be adjusted for the purpose of compensating for wear, thus at all times causing the rim to maintain a perfect fit with respect to the wheel to which it is attached, and thereby eliminating sounds resulting from loose or worn parts rubbing in contact with one another.

With the above and other objects in view reference is had to the accompanying drawings in which—

Figure 1 is a view in elevation of a wheel equipped with a rim constructed in accordance with the present invention;

Fig. 2 is a detail view in elevation of the rim on an enlarged scale;

Fig. 3 is a vertical sectional view taken on the line 3—3 of Fig. 2;

Fig. 4 is a detail view in plan of a section of the rim;

Fig. 5 is a horizontal sectional view showing the manner in which the lugs carried by the ring are received by the felly band;

Fig. 6 is a detail perspective view of the inner face of a portion of the rim showing the relative location of the lugs which are carried thereby;

Fig. 7 is a detail perspective view of the ends of the locking bands;

Fig. 8 is a detail sectional view taken on the line 8—8 of Fig. 1 showing the manner in which the locking band is secured against accidental displacement, and Fig. 9 is a view in rear elevation of the locking band.

Referring more particularly to the drawings, the reference character 10 designates the spokes of the wheel, and carried by such spokes 10 is a felly 11. This felly 11 is provided on its peripheral face with a felly band 12 provided upon one of its side edges with a channel 13 which extends inwardly of the felly 11 and preferably in contact with one of the side edges thereof. This felly band 12 is provided at spaced intervals with depressed portions 14 substantially V-shaped or wedge-shaped as shown by the reference character 15 in Fig. 5. As more clearly shown in Fig. 3, these depressed portions have their bottom wall 16 angularly disposed in such a manner that it slopes downwardly to one side of the wheel, preferably the outer side thereof.

The reference character 17 designates the rim which may be of any preferred form. In carrying out the invention, the rim is provided on its inner peripheral face with a pluralty of lugs 18, which are secured thereto in any desired manner, such as spot-welding, or the rim may be formed in its manufacture with these lugs as an integral part thereof. The number of lugs employed on each rim corresponds to the number of depressed portions 14 formed in the felly band, and, as shown in Fig. 5, these lugs 18 have their side edges 19 tapered correspondingly with the taper of the side walls of the depressed portions 14. The inner face 20 of each of these lugs 18 is inclined correspondingly to the bottom wall 16 of the depressed portions 14 and the outer edge 21 of each of these lugs is angularly disposed as more clearly shown in Fig. 5. It is to be understood that when the rim 17 is positioned upon the wheel the lugs 18 will be so positioned with respect to the depressed portions 14 that said lugs will be received therein.

Adapted to be received within the channel 13 heretofore mentioned is a sectional clamping ring. This ring comprises two members 22 and 23. Each of these members is provided on its ends with depending arms 24 and 25, respectively. These depending arms 24 and 25 are of half the thickness of the members 22 and 23 and are adapted to normally occupy a position in overlapped relation and to be secured together by suitable fastenings passing through the openings 26 formed in the members. These members when placed together provide a continuous ring and such ring is provided with cut-out portions 27 spaced in the same relation as the lugs 18 of the rim 17, and the ring is adapted to be moved in the channel 13 to a position where these cut-out portions 27 will register with the depressed portions 14 of the felly band to permit of the rim 17 moving to position upon the felly band. As more clearly shown in Fig. 5, this clamping ring is formed adjacent each of the openings with an angular wall 28, and each of such walls is adapted to engage the face 21 of its respective lug 18, and the inclined wall 28 serves as a wedge to force its respective lug into its respective depressed portion 14 in the felly band and secure the same therein against accidental displacement.

After the rim and the clamping ring have been positioned, the side walls of the channel 13 are compressed about the clamping ring by means of a bolt 30, which action prevents a slipping of the clamping ring and a consequent loosening of the rim.

From the foregoing it is apparent that the present invention provides a new and improved rim for vehicle wheels which may be readily attached to and detached from the wheel, which operation requires only the loosening of a single bolt and a circumferential movement of the clamping ring a sufficient distance to bring its openings 27 into registry with the lugs of the rim, whereupon the rim may be slipped from the wheel.

The embodiment of the invention shown and described is the preferred form, but it is to be understood that changes may be made in the proportions, form and construction of the several parts without departing from the spirit of the invention and within the scope of the appended claims.

What is claimed is:

1. A device of the character described comprising a rim having a plurality of lugs, a wheel adapted to receive said rim and having notches adapted to receive said lugs, a channel member carried by the wheel, a clamping ring adapted for movement circumferentially of said channel member for retaining the rim on the wheel, and means for preventing movement of said clamping ring, said means comprising a bolt passing through the walls of the channel member and adapted to clamp the walls of said channel member about the clamping ring.

2. In combination with a wheel having a felly band provided with depressed portions, a rim, lugs carried by said rim and adapted to be received in the depressed portions of the felly band, the faces of said lugs and the faces of said depressed portions being angularly disposed whereby a wedging action is had when the rim is positioned on the wheel, a locking ring, means for supporting said locking ring in locked position, said means comprising a channel member, and means for causing a gripping of the walls of the channel of said channel member about said locking ring to prevent accidental movement thereof.

3. In a wheel, a felly band having an offset channel extending circumferentially of the wheel, the diameter of said channel being not greater than the diameter of the felly band of the wheel, a rim adapted to pass over said channel to position on said felly band, a locking ring mounted in said channel and serving to secure the rim in place on the felly band, and means for causing the channel to grip the locking ring to prevent accidental displacement thereof.

PERRY M. ADEN.